United States Patent

Petro et al.

[15] 3,663,793
[45] May 16, 1972

[54] METHOD OF DECORATING A GLAZED ARTICLE UTILIZING A BEAM OF CORPUSCULAR ENERGY

[72] Inventors: James Petro, Little Falls; Clair M. Rively, Old Bridge, both of N.Y.

[73] Assignee: Westinghouse Electric Corporation, Pittsburgh, Pa.

[22] Filed: Mar. 30, 1971

[21] Appl. No.: 129,438

[52] U.S. Cl. ................... 219/121 LM, 219/121 EM, 101/35, 118/49.5
[51] Int. Cl. ........................................................ B23k 9/00
[58] Field of Search .............. 219/121 L; 117/46 FC, 46 FB, 117/17.5; 346/76 L; 264/80

[56] References Cited

UNITED STATES PATENTS

| | | | |
|---|---|---|---|
| 3,465,352 | 9/1969 | Carlson et al. | 346/76 L |
| 3,238,053 | 3/1966 | Morgan | 117/17.5 |
| 3,474,457 | 10/1969 | Becker | 346/76 L |
| 2,372,761 | 4/1945 | Boyd | 117/46 FC |
| 3,482,008 | 12/1969 | Hibshman | 264/80 |
| 3,056,881 | 10/1962 | Schwarz | 219/50 |
| 3,573,847 | 4/1971 | Sacerdoti | 346/76 |

Primary Examiner—J. V. Truhe
Assistant Examiner—Gale R. Peterson
Attorney—A. T. Stratton, W. D. Palmer and D. S. Buleza

[57] ABSTRACT

The surface of an article, such as a glass envelope for an electric lamp, is provided with a decorative pattern or indicia by coating the article with a vitreous material that includes a substance (such as lead oxide) that undergoes a permanent change in color when heated under reducing conditions, subjecting the article to a laser beam and a reducing gas flame, and varying the position of the article relative to the beam at a speed and in a manner such that the beam scans the article and thereby melts preselected portions of the vitreous coating and changes the color of such portions. In the case of a vitreous or ceramic article that is susceptible to thermally-induced fracturing, the vitreous coating material is preferably deposited on the article in the form of a frit and the article is preheated to a temperature which is near or above its strain point, thus fusing the frit in place just before the glazed heated article is exposed to the reducing environment and laser beam.

An apparatus and method for concurrently firing a glass frit on an article and color-etching the resulting glazed article with a laser having control means which includes a prototype article are also disclosed.

8 Claims, 6 Drawing Figures

Patented May 16, 1972

WITNESSES
Theodore F. Wrobel
James F. Young

INVENTORS
James Petro and
Clair M. Rively
BY
D. S. Buleza
AGENT

Patented May 16, 1972

METHOD OF DECORATING A GLAZED ARTICLE UTILIZING A BEAM OF CORPUSCULAR ENERGY

CROSS-REFERENCE TO RELATED APPLICATION

The subject matter of this application is an improvement upon the invention disclosed in pending application Ser. No. 779,995 filed Nov. 29, 1968 by the same inventors and assigned to the same assignee as the present application.

BACKGROUND OF THE INVENTION

1. Field of the Invention

The present invention relates to the art of decorating articles and has particular reference to a novel method for forming an indicia or pattern on the surface of an article, such as a glass lamp envelope, that is provided with a vitreous glaze and thereby producing an article that has the desired indicia or pattern permanently inscribed in its glazed surface.

2. Description of the Prior Art

Various methods have been developed down through the years for decorating articles that are provided with a colored vitreous coating. In the case of glass bulbs for incandescent lamps or other light sources, the desired decorative design or pattern is customarily formed by masking certain areas of the bulb or removing selected portions of the coating with chemicals or other suitable means. Both methods are tedious, costly and must be very carefully controlled if aesthetically pleasing results are to be obtained. This is particularly true when the article is coated with a pigmented glass frit that is fired and fused in situ to form a vitreous enamel or glaze.

SUMMARY OF THE INVENTION

Briefly, the present invention provides a novel and efficient method for decorating the surface of a glazed article by utilizing a beam of corpuscular energy and either an oxidizing or a reducing environment to modify the color of selected portions of the glazed surface.

According to one embodiment, the article is coated with a pigmented glaze that contains a constituent, such as lead oxide, which is transformed into another substance and changes color when heated under reducing conditions, and the glazed article is then scanned by a laser beam (or an electron beam) while exposed to a reducing gas flame to effect the color change and produce the desired decorative pattern. If the article is made of glass or a ceramic material which will fracture when struck by the beam, the article is preheated to reduce thermally-induced stresses in the article and thus prevent it from cracking. In such cases, the article is coated with a suitable pigmented glass frit and preheated with a gas flame which is initially oxidizing in nature — thus firing the frit and heating the article above its strain point in a single operation. The resulting glazed heated article is then concurrently exposed to the laser beam and a reducing gas flame to effect the desired color-etching.

Since laser and electron beams can be readily focused and precisely controlled, intricate decorative patterns and indicia can be color-etched into the glazed surfaces of various articles at a rate and with a consistency heretofore unattainable.

BRIEF DESCRIPTION OF THE DRAWING

A better understanding of the invention will be obtained by referring to the accompanying drawing, wherein.

PREFERRED EMBODIMENTS OF THE INVENTION (FIGS. 1-2)

Broadly considered, the present invention encompasses the concept of decorating the surface of a glazed article by scanning the article with a beam of corpuscular energy, such as a laser beam, at a speed and in a manner such that the beam melts preselected portions of the glaze or vitreous coating and, in conjunction with either an oxidizing or a reducing gas flame, changes the color of such portions and thereby forms the desired pattern or indicia without affecting the other portions of the coating. The invention accordingly requires a glaze or vitreous coating which contains a constituent that changes into a material of a different hue or color when heated to a high temperature under reducing or oxidizing conditions.

Figure 1:
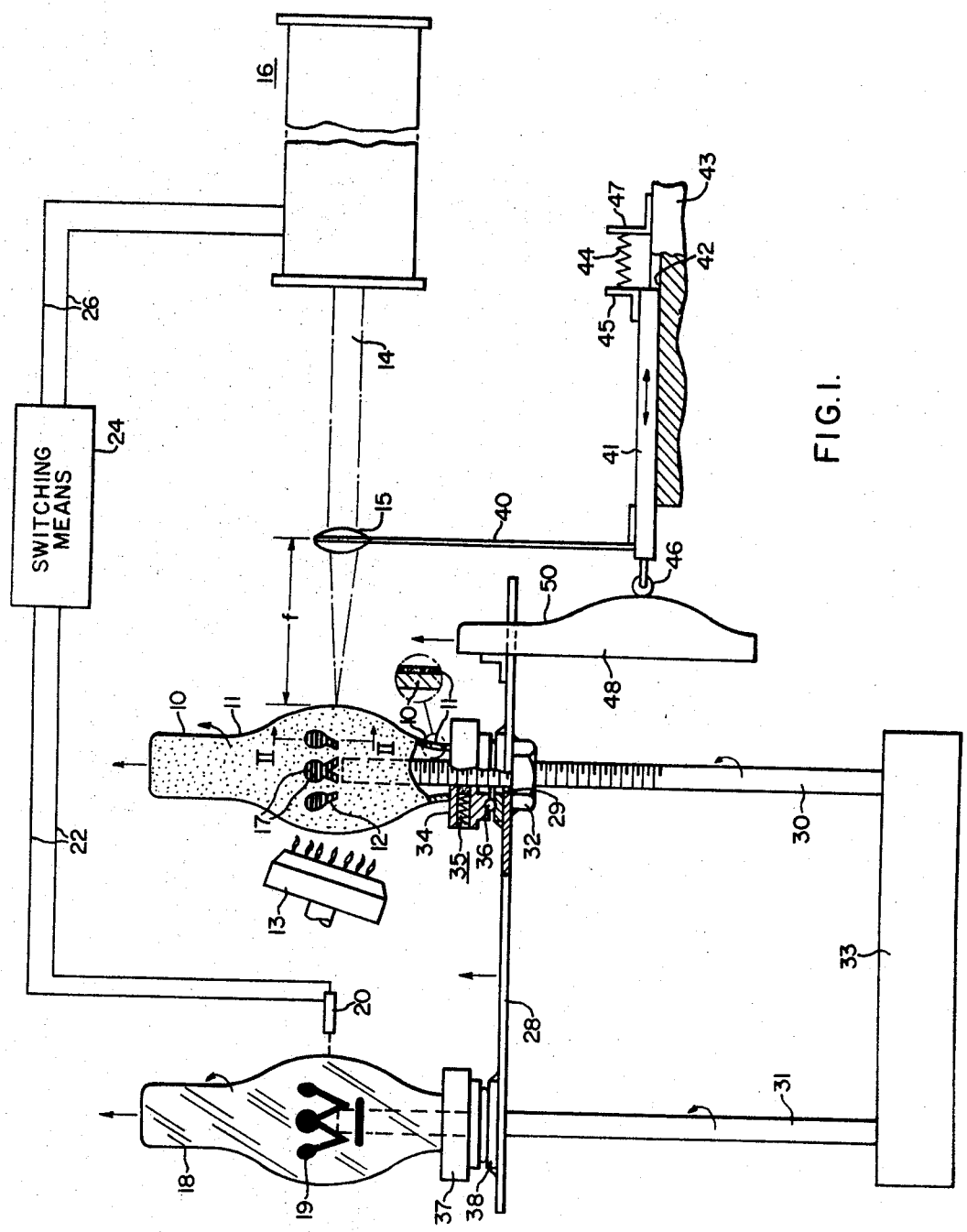
FIG. 1 is an elevational view of an apparatus for glazing and color-etching a lamp bulb in accordance with the present invention by means of a laser that is controlled by a photocell which scans a prototype bulb having the desired indicia painted thereon.

In FIG. 1 there is shown an apparatus for concurrently firing a pigmented glass-frit coating 11 onto the surface of a glass lamp envelope 10, heating the envelope to a temperature above its strain point, and color etching the resulting glazed envelope with a laser beam 14 in accordance with a preferred embodiment of the invention.

The apparatus is depicted in the process of color-etching a "W" in the surface of a latern-shaped envelope 10 that is composed of conventional soda-lime glass and is coated with a layer 11 of a suitable pigmented glass frit that contains lead oxide. As indicated by the arrows, the envelope 10 is rotated about and advanced along its longitudinal axis while it is concurrently subjected to a gas flame from a burner 13 and a laser beam 14 that is generated by a stationary laser 16 which is so oriented that the laser beam is substantially normal to the coated surface of the envelope. The laser 16 comprises a 100 watt $CO_2$ type laser of conventional construction that produces a beam of coherent radiation that has a wavelength of 10.6 microns. Such lasers are well known in the art.

In this particular embodiment the pigmented glass-frit layer 11 comprises a material that forms a light-transmitting white glaze or enamel when fired under oxidizing conditions and is deposited on the envelope 10 in the form of a wet slurry or slip which dries to a powdery texture. The slip had the following formulation; 61.04 kilograms of a high lead, cadmium glass frit (marketed by the Ferro Corporation, Cleveland, Ohio as "Lead Base Glass Frit VG 540") 3 kilograms of powdered $TiO_2$, 1.45 kilograms of powdered $ZrO_2$, 28.34 kilograms of isopropyl alcohol, and 300 cc. watter.

The aforesaid constituents were placed into a 15 gallon ball mill, milled for 24 hours and the resulting slip was sprayed onto the envelopes and air dried. The resulting powdery layer fused into a smooth white enamel coating or glaze 11 when fired at a temperature of 700° C, by the burner 13. Since this temperature is very close to the softening point (695° C.) and above the strain point (470° C.) of the soda-lime glass envelope 10, the white glaze comprised a tenacious and durable coating and the heated envelope did not fracture when struck by the laser beam 14. The fuel for the burner 13 consisted of a mixture of natural gas (or propane) and air (or oxygen, which mixture was initially adjusted to provide a flame that was oxidizing in character during the frit firing operation. The fuel mixture to the burner 13 was then adjusted to provide a flame which was reducing in character so that the lead oxide in selected portions of the glaze 11 was converted into lead when the glaze was subsequently struck and melted by the beam 14.

As will be noted, the laser beam 14 is focused onto the glazed surface 11 of the envelope 10 by a lens 15 that is positioned between the envelope 10 and laser 16 at a distance $f$ from the envelope surface which is equal to the focal length of the lens. A prototype envelope 18 of the same size and shape as the envelope 11 being processed is rotated and axially advanced at the same speed by an envelope-feeding mechanism which will be described.

The prototype envelope 18 has the desired indicia 19, such as a "W" in the case here illustrated, outlined on its surface in black print or other suitable contrasting material so that it will be sensed or detected by a stationary photocell 20 that is supported adjacent and abreast of the prototype envelope 18. The photocell 20 is so oriented that it scans the indicia 19 as the prototype envelope 18 is rotated and progressively advanced along its longitudinal axis. The output of the photocell 20 is fed by conductors 22 into a suitable switching means 24 which is, in turn, connected to the laser 16 by conductors 26 and controls the input to the laser so that the latter is pulse operated accordance with the electrical signals generated by the photocell 20 as it scans the prototype envelope 18. The indicia 19 on the prototype envelope 18 is thus reproduced in the glazed surface 11 of the envelope 10 in the form of a series of dark lines 17 that are produced by the heating effect of the impinging pulses of the laser beam 14 and define a "W" which is denoted by the reference numeral 12.

Figure 2:
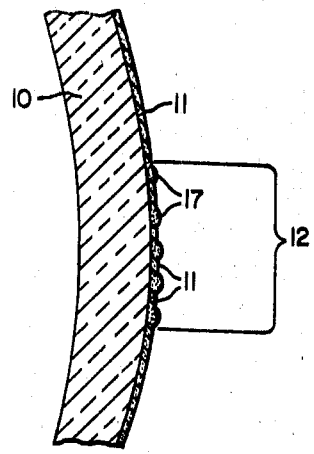
FIG. 2 is an enlarged cross-sectional view through a color-etched portion of the bulb, taken along line II—II of FIG. 1.

As shown more clearly in FIG. 2, the lines 17 are raised slightly and separated by portions of the glaze 11 that were not struck by the laser beam 14 and thus retained their original white color. Due to the reducing nature of the flame from the burner —during laser impingement, the lead oxide in the portions of the glaze 11 struck by the laser beam 14 is converted into lead when the glaze is locally heated and melted by the beam. The lines 17 thus have a silvery or black color, depending upon the amount of reduction which occurs. The color density of the lines 17 and the indicia they delineate can accordingly be readily varied simply by adjusting the gas-air (or gas-oxygen) mixture fed to the burner 13. In any event, the lines 17 define a pattern or indicia 12 which is dark and sharply contrasts with the white glazed portions 11 of the envelope 10 not struck by the laser beam 14.

The width of the lines 17 or colored regions formed in the glazed surface 11 can be increased by using a lens 15 which slightly defocuses the laser beam 14 and thus produces localized heating over a larger area or spot. Of course, the power input per unit area of the defocused beam must be sufficient to heat the glaze 11 to a temperature which will reduce the lead oxide to lead. Hence, a 100 watt laser will provide lines 17 or etched areas of a given maximum dimension. If lines or areas of larger size are desired, then a more powerful laser must be used —or the speed at which the beam — scans the glazed surface must be reduced to one which enables the defocused beam to achieve the required heating and temperature.

If any undesirable darkening of the white portions of the glaze 11 occurs during the decorating operation, this can be corrected by subjecting the color-etched envelope 10 to an oxidizing flame and re-oxidizing the lead in the aforesaid portions of the glaze. Such subsequent oxidizing-flame treatment will not materially change the color of the dark lines 17 due to the severity of the reduction of lead oxide into lead and the depth of coloration produced by the laser beam 14.

As will be noted in FIG. 1, the envelope-feeding mechanism comprises a platform 28 having an aperture 29 which accommodates an upstanding threaded rod or spindle 30. The spindle 30 threadably engages a nut 32 that is rigidly fastened to the underside of the platform 28 so that the latter rises and falls as the spindle is rotated relative to the nut. A suitable bulb-holder such as an annular chuck 34 is frictionally coupled to the spindle 30 by a spring-plunger assembly 35 that extends laterally through the chuck and is in pressured but slidable contact with the spindle. The chuck 34 is rotatably supported on the platform 28 by a bearing 36 that is fastened to the upper surface of the platform. The chuck 34 thus rotates along with the spindle 30 and concurrently is able to move upwardly along with the platform 28 as it is advanced by the interaction of the nut 32 and spindle 30.

The prototype envelope 18 is concurrently rotated in the same direction by a second spindle 31 that extends through a second opening (not shown) in the platform 28 and is frictionally coupled to a second chuck 37 that is also rotatably mounted on the platform by a second bearing 28. The spindles 30, 31 are rotated at a suitable speed by a conventional driving means 33 consisting of an electric motor and interconnecting gears or belts (not shown). The envelope 10 being processed and the prototype envelope 18 are accordingly, rotated at the same rate of speed and, since they are both carried by the platform 28, they are also advanced upwardly relative to the laser beam 14 at the same rate of speed. Thus, an exact reproduction of the indicia 19 provided on the photo-type envelope 18 is color-etched into the glazed surface 11 of the envelope 10 by the laser beam 14.

Since the profile of the envelope 10 is curved along the direction in which the envelope is being advanced relative to the laser beam 14, suitable means must be provided to maintain the laser beam in focused relationship with the glazed surface of the envelope 10 during the color-etching process. This is achieved in the apparatus shown in FIG. 1 by mounting the lens 15 on a support 40 that is secured to a carrier 41 which is reciprocally movable along a channel 42 provided in the stationary bed plate 43 of the apparatus. The channel 42 extends parallel to the laser beam 14 and the carrier 41 is retained within the channel by a spring 44 that is secured to holders 45, 47 attached to the carrier and bed plate, respectively. The spring 44 urges the carrier 41 toward a cam 48 that is fastened to and depends downwardly from the platform 28 and presses a roller 46 located on the end of the carrier 41 against the surface 50 of the cam 48.

As shown, the cam surface 50 has the same profile as the envelope 10. Thus, as the cam 48 moves upwardly along with the platform 28, the carrier 41 is moved laterally by the action of the roller 46 and cam surface 50 in a manner such that the position of the lens 15 is automatically adjusted to compensate for the difference in the spacing between the laser 16 and the glazed surface of the envelope 10 that occur as the envelope is advanced. The lens 15 is accordingly maintained at a fixed distance $f$ from the envelope's glazed surface 11 and the laser beam 14 remains in focused relationship with the latter as it color-etches the indicia 12.

While no support means have been shown for the laser 16, drive means 33, bed plate 43, photocell 20, switching circuit 24 or burner 13, it will be appreciated that all of these components are mounted on a suitable frame so as to constitute a unitary machine which operates in the manner described.

ALTERNATIVE EMBODIMENTS (FIGS. 3–6)

Figure 3:
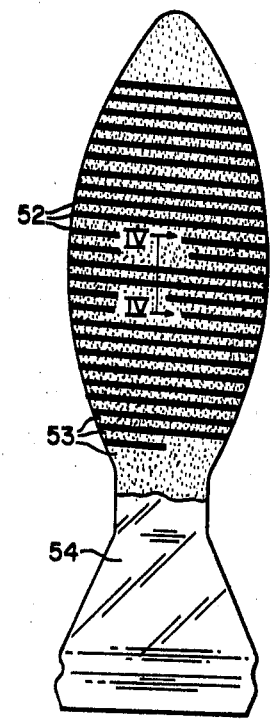
FIGS. 3 and 4 are elevational and enlarged fragmentary views, respectively, of another glazed lamp bulb having a different decorative pattern color-etched into its surface in accordance with the invention; and, FIGS. 5 and 6 are similar views of still another type of decorated lamp bulb.

The invention is not limited to providing an isolated color-etched indicia or decorative pattern in the glazed surface of a glass lamp bulb but can be used to decorate any desired area of the bulb. For example, as shown in FIG. 3, a continuous helical silvery-black band 52 can be formed in a white lead-oxide containing glazed surface 53 of a lamp envelope 54 by operating the laser 16 continuously and concurrently rotating and axially advancing the envelope 54 at a uniform rate relative to the laser beam 14 (as by the apparatus shown in FIG. 1) so as to progressively color-etch the glaze 53.

Figure 4:
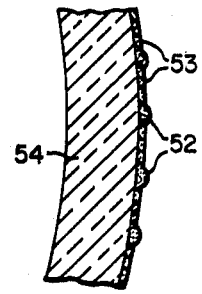

As will be noted in FIG. 4, the darkened band 52 in the glaze 53 is raised slightly but remains an integral part of the glaze. While some of the glaze is vaporized and removed by the action of the impinging laser beam 14, the surface of the envelope 54 remains completely covered by the glaze as shown.

Figure 5:
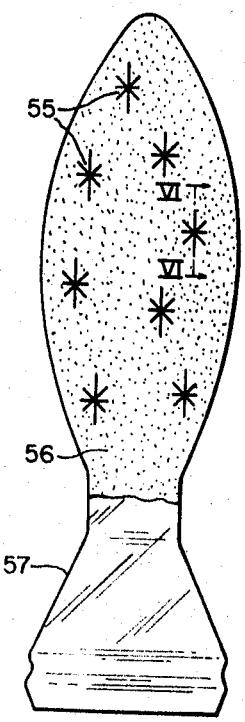

Alternatively, a series of decorative patterns, such as randomly-spaced "snowflake" designs 55, can be color-etched in the white lead-oxide containing glazed surface 56 of a glass lamp envelope 57 as shown in FIG. 5. The "snow-flake" designs 55 are silvery-black against a white translucent background and can be readily formed by properly programming the laser 16 and movement of the envelope 57 by means well known in the art.

Figure 6:
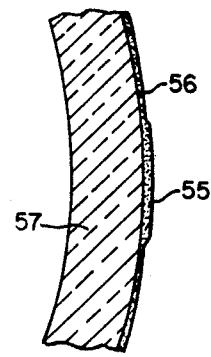

As illustrated in FIG. 6, the designs 55 are again slightly raised from the envelope surface but constitute integral parts of the glazed coating 56 as in the previously described embodiments.

OTHER EMBODIMENTS

The invention is not limited to decorating soda-lime glass envelopes for lamps but may be used to color-etch various articles such as glazed metal or plastic vessels or bodies and lamp envelopes, mantles, etc. that are composed of high-silica content glass, quartz, polycrystalline alumina and other known semicrystalline or glass-ceramic type materials.

If the article is composed of material such as glass or polycrystalline alumina that has a high thermal expansion coefficient (that is, in excess of approximately $15 \times 10^{-7}$ per °C), then the article should be preheated to a temperature near or above its strain point if thermally-induced stresses and resultant fracturing of the material during the color-etching of the glazed surface are to be avoided. This precaution is not necessary in the case of quartz and similar materials which have coefficients of ex-pansion lower than approximately $15 \times 10^{-7}$ per °C since they will withstand the thermal shock of the impinging laser beam without fracturing. Quartz and fused silica have a coefficient of expansion of about $6 \times 10^{-7}$ per °C. High content silica glass (over 96 percent silica) has an expansion coefficient of about $8 \times 10^{-7}$ per °C and, thus, could also be color-etched by a laser without preheating.

In the case of glazed metal or plastic articles, the only requirement is that the glaze or vitreous coating contain a material that will be converted into another material (or form) having a distinctively different color when the coating is heated by the laser or electron beam under reducing or oxidizing conditions, or in a reducing or oxidizing atmosphere. As a specific example, a metal body that is coated with a green-colored fritted glaze which contains chromium oxide (or other chromium compounds such as potassium dichromate) can be color-etched in accordance with the invention to provide an indicia or pattern that is defined by black lines or regions against a green-colored background.

By adjusting the power density per unit area of the impinging beam 14, portions of the glaze 11 on the bulb 10 can also be removed by the beam to provide a combination of sculptured transparent regions and color-etched glazed regions in the surface of the bulb.

We claim as our invention;

1. The method of decorating an article, which method comprises;
   coating the article with a material that contains a constituent which undergoes a color change when heated in a predetermined environment,
   subjecting the coated surface of said article to a beam of corpuscular energy and concurrently providing said predetermined environment thereat so that the portion of the coated surface which is struck by said beam is heated to a temperature sufficient to change the color of said constituent and the associated portion of said coating, and
   varying the relative position of said coated article and beam at a speed and in a manner such that the beam scans the coated surface of the article and changes the color of selected portions of the coating and thereby produces the desired indicia or pattern in the coated surface of the article.

2. The method of claim 1 wherein said predetermined environment is one which is reactive in nature.

3. The method of claim 2 wherein said predetermined environment is reducing in nature and is produced by an impinging gas-rich flame.

4. The method of claim 1 wherein;
   said coated article is composed of a material that has a coefficient of thermal expansion such that it fractures when rapidly heated to a temperature above its strain point,
   said beam of corpuscular energy comprises a laser beam, and
   at least the portion of said coated article that is struck by the laser beam is preheated to a temperature near its strain point.

5. The method of claim 4 wherein;
   said article comprises a glass body, and
   said coating comprises a pigmented light-transmitting glaze that includes a fused glass frit.

6. The method of claim 5 wherein:
   said glass body comprises an envelope for an electric lamp,
   said light-transmitting glaze contains a white pigment,
   said predetermined environment is reducing in nature, and
   the fused glass frit constituent of said glaze contains lead oxide at least a portion of which is converted by the localized heating action of said impinging laser beam and said reducing environment into lead so that said indicia or pattern is defined by silvery-black regions in said glaze.

7. The method of claim 5 wherein:
   said glaze is formed by coating the glass body with a powdered pigment-glass frit mixture that is fired in situ by a gas flame, and
   the firing of said pigment-glass frit mixture and the preheating of the glass body near its strain point are concurrently effected by a gas flame.

8. The method of claim 7 wherein said gas flame is oxidizing in nature during the firing and preheating operation and is subsequently made reducing in nature during the laser-scanning and decorating operation.

* * * * *